3,337,578
2,2'-ALKYLENEBISBENZIMIDAZOLES

Alfred Bader, Milwaukee, Wis., Boyd E. Graham, Kalamazoo, Mich., and Ernst Reif, Heidenheim an der Brenz, Germany, assignors to Heidenheimer Chemisches Laboratorium, Heidenheim an der Brenz, Germany, a company
No Drawing. Filed Sept. 15, 1961, Ser. No. 138,246
13 Claims. (Cl. 260—309.2)

This application is a continuation-in-part of application Ser. No. 39,791, filed June 30, 1960, and now abandoned.

This invention relates to novel chemical compounds and is more particularly concerned with novel alkyl-substituted 2,2'-alkylenebisbenzimidazoles and the acid addition salts thereof.

The novel compounds of the invention are selected from the class consisting of (a) a compound represented by the following formula:

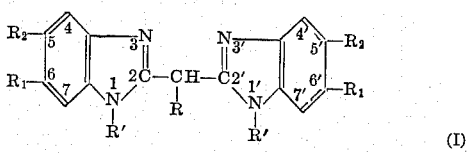

wherein R is selected from the class consisting of hydrogen and lower-alkyl, for example, methyl, ethyl, propyl, butyl, amyl, hexyl, and isomeric forms thereof, $R_1$ and $R_2$ represent lower-alkyl, for example, methyl, ethyl, propyl, and isopropyl, and R' is selected from the class consisting of hydrogen and lower-alkyl, for example, methyl, ethyl, propyl, butyl, and isomeric forms thereof, and (b) the pharmacologically acceptable acid addition salts thereof.

The novel compounds of the invention exhibit pharmacological activity. For example, the compounds of the invention can be used as diuretics and sedatives in the treatment of animals and humans. In addition, the compounds of the invention can be used as intermediates in the preparation of dyestuffs in accordance with U.S. Patent 2,697,712.

The novel compounds of the invention having the Formula I can be prepared using a variety of methods. For example, the compounds having the Formula I can be prepared by condensing the appropriately substituted 1,2-phenylenediamine having the formula:

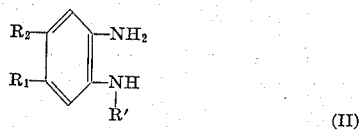

wherein $R_1$, $R_2$, and R' have the significance hereinbefore defined, with malonamide or a derivative thereof having the formula $RCH(CONH_2)_2$ wherein R has the significance hereinbefore defined, using the procedure described by Lane, J. Chem. Soc. 1953, 2238, for the preparation of 2,2'-methylenebisbenzimidazole and 2,2'-methylenebis(5-methylbenzimidazole).

Alternatively, the compounds having the Formula I can be prepared by condensing the appropriately substituted 1,2-phenylenediamine having the Formula II with malonic ester or a substituted malonic ester having the formula $RCH(COOR_3)_2$ wherein $R_3$ represents an alkyl group, preferably an ethyl group, and R has the significance hereinbefore defined, using the procedure described by Arnold, J. Org. Chem., 23, 565, 1958, for the preparation of 2,2'-methylenebisbenzimidazole.

It is to be noted that the above methods of synthesis give rise to a mixture of the desired compound having the Formula I and a compound having the formula:

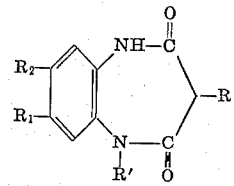

wherein R, $R_1$, $R_2$, and R' have the significance hereinbefore defined. This mixture can be separated readily by treatment with a strong mineral acid such as hydrochloric acid in solution in a mixture of water and a water-miscible organic solvent such as dimethylformamide in which the hydrochloride of the desired Compound I is soluble but in which the other component of the mixture is insoluble. The desired compound having the Formula I can then be recovered by neutralization of the solution and can be purified by conventional procedures, for example, by recrystallization.

In a further alternative the compounds having the Formula I can be prepared by condensing the appropriately substituted 1,2-phenylenediamine having the Formula II with a malonimino dialkyl ether dihydrochloride or a substituted derivative thereof having the formula

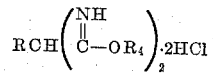

wherein R has the significance hereinbefore defined and $R_4$ represents alkyl, preferably ethyl, using the procedure described by Thomas and Tyler, J. Chem. Soc., 1957, 2197, for the preparation of alkylenebisbenzimidazoles. The malonimino dialkyl ether dihydrochlorides employed in the above reaction can be prepared by treating the appropriately substituted malononitrile $RCH(CN)_2$, wherein R has the significance hereinbefore defined, with hydrogen chloride and the appropriate alkanol $R_4OH$, wherein $R_4$ has the significance hereinbefore defined, in the presence of an inert solvent such as dioxane.

The 4,5-dialkyl-1,2-phenylenediamines having the Formula II which are employed as starting materials in the above-described syntheses, can be prepared by methods which are well-known in the art. For example, the 1,2-phenylenediamines having the Formula II wherein R' is hydrogen can be prepared by nitration of the corresponding 1,2-dialkylbenzenes to yield the corresponding 1,2-dialkyl-4-nitrobenzenes, reduction of the latter to the corresponding 3,4-dialkylanilines, conversion of the anilines so obtained to their urethanes, and nitration of the latter followed by hydrolysis to yield the corresponding 4,5-dialkyl-2-nitroanilines and reduction of the nitro compounds so obtained to yield the desired 4,5-dialkyl-1,2-phenylenediamines. The procedure involved in the above series of reactions is that described by Lambooy, J. Am. Chem. Soc. 71, 3756, 1949, for the preparation of 4,5-diethyl-1,2-phenylenediamine. Further for example, the 4,5-dialkyl-1,2-phenylenediamines having the Formula II wherein R' is lower-alkyl can be prepared by known methods, e.g., by the method described in U.S. Patent 2,400,872 for the preparation of N-methyl- and N-ethyl-1,2-phenylenediamine.

The acid additions salts of the invention comprise the salts of the compounds having the Formula I above with pharmacologically acceptable acids such as sulfuric, hydrochloric, hydrobromic, nitric, phosphoric, benzoic, p-toluenesulfonic, salicyclic, acetic, propionic, tartaric, citric, succinic acids, and the like. The acid addition salts of the invention can be prepared by conventional methods. For example, the compound having the Formula I can be treated with at least a stoichiometric amount of the appropriate acid; according to the nature of the solvent employed the desired salt will separate spontaneously or can be precipitated by the addition of a solvent in which the salt is insoluble.

The novel compounds of the invention can be combined with solid or liquid pharmaceutical carriers and formulated as tablets, powder packs, or capsules, using starch and like excipients, or dissolved or suspended in suitable solvents or vehicles, for oral or parenteral administration.

The following examples are illustrative of the process and products of the present invention but are not to be construed as limiting.

EXAMPLE 1

*2,2'-methylenebis(5,6-dimethylbenzimidaole)*

A mixture of 136 g. (1.0 mole) of 4,5-dimethyl-1,2-phenylenediamine (Beilsteins Handbuch der Organischen Chemie, 13, 179, fourth edition, 1930) and 51 g. (0.5 mole) of malonamide in 300 ml. of ethylene glycol was heated under reflux for 4 hours. The resulting mixture was allowed to cool before being treated with an approximately equal volume of water. The solid which separated was isolated by filtration and recrystallized from ethylene glycol.

The solid so obtained was slurred in 1460 ml. of dimethylformamide and the slurry was stirred with 1460 ml. of water and 146 ml. of concentrated hydrochloride acid. The resulting mixture was stirred for 5 minutes and then filtered. The solid so isolated was washed with water on the filter and then discarded. The combined filtrate and washings were made alkaline by the addition of concentrated ammonium hydroxide solution and the solid which separated was isolated by filtration, washed with water, and dried in vacuo. There was thus obtained 2,2'-methylenebis(5,6-dimethylbenzimidazole).

EXAMPLE 2

*2,2'-methylenebis(5,6-dimethylbenzimidazole) and the dihydrochloride thereof*

(A) *Malonimino diethyl ether dihydrochloride.*—Anhydrous hydrogen chloride was passed into 500 ml. of dioxane (previously dried over sodium and redistilled), maintained at approximately 10° C. in a cooling bath, until 124 g. of hydrogen chloride has been absorbed. The resulting solution was cooled to approximately 5° C. and to the solution was added, slowly with stirring, a solution of 33 g. (0.5 mole) of malononitrile in 46 g. (1.0 mole) of anhydrous ethanol (prepared by the method of Manske, J. Am Chem. Soc., 53, 1106, 1931) and 50 ml. of dry dioxane (previously treated as described above). The resulting mixture was maintained at approximately 5° C. and stirred for 3 hours. The mixture was then allowed to stand (12 hours) at approximately 5° C. until the oil which separated had solidified. The resulting solid was isolated by filtration, washed on the filter which anhydrous ether, and dried in vacuo. There was thus obtained 97 g. of malonimino diethyl ether dihydrochloride in the form of a solid having a melting point of 130 to 138° C. This material was used, without further purification, in the process described below.

(B) *2,2'-methylenebis(5,6-dimethylbenzimidazole).*—A mixture of 5.44 g. (0.04 mole) of 4,5-dimethyl-1,2-phenylenediamine and 4.62 g. (0.02 mole) of malonimino diethyl ether dihydrochloride (prepared as described above) in 70 ml. of absolute ethanol was heated under reflux for 45 minutes. To the solution so obtained was added 80 ml. of water and the mixture was treated slowly with 5 ml. of 28 percent aqueous ammonium hydroxide solution. The resulting slurry was stirred and cooled for approximately 2 hours before isolating the solid by filtration and washing thoroughly with water on the filter. The isolated solid was slurried several times with a total of 80 ml. of acetone before being dried in vacuo. There was thus obtained 2,2'-methylenebis(5,6-dimethylbenzimidazole) in the form of a solid having a melting point higher than 330° C.

(C) *2,2' - methylenebis(5,6 - dimethylbenzimidazole) dihydrochloride.*—A slurry of 4.95 g. (0.016 mole) of 2,2'-methylenebis(5,6 - dimethylbenzimidazole) in 50 ml. of absolute ethanol was stirred vigorously and heated to 60° C. To the hot slurry was added slowly a solution of 1.5 g. (0.041 mole) of anhydrous hydrogen chloride in 50 ml. of absolute ethanol. The hot mixture was stirred for 15 minutes after the addition was complete and was then allowed to cool. The cold mixture was treated with 50 ml. of acetone and the resulting mixture was cooled in an ice bath and stirred for 2 hours. The solid which separated was isolated by filtration and washed on the filter with two 25-ml. portions of acetone before being dried in vacuo. There was thus obtained 5.75 g. of the dihydrochloride of 2,2'-methylenebis(5,6-dimethylbenzimidazole) in the form of a crystalline solid having a melting point higher than 330° C.

*Analysis.*—Calcd. for $C_{19}H_{22}Cl_2N_4$: C, 60.48; H, 5.88; Cl, 18.80; N, 14.85. Found: C, 60.42; H, 5.97; Cl, 18.89; N, 15.13.

EXAMPLE 3

*2,2'-propylidenebis(5,6-dimethylbenzimidazole) and the dihydrochloride thereof*

A solution of 18.6 g. (0.137 mole) of 4,5-dimethyl-1,2-phenylenediamine in 100 ml. of 1,2,4-trichlorobenzene was heated to 170 to 180° C. with stirring and to the solution was added dropwise, over a period of 1.5 hours, 12.8 g. (0.0685 mole) of diethyl ethylmalonate. After the addition was complete the temperature was slowly raised to 190 to 195° C. and maintained at this level with stirring for a further 2 hours. The ethanol and water liberated during the reaction were remoped by distillation. The resulting suspension was cooled and the solid which had separated was isolated by filtration and washed on the filter with benzene and then with ethanol before being dried in vacuo. The crude product so obtained was slurried in 200 ml. of dimethylformamide and the slurry was stirred with 200 ml. of water and 20 ml. of concentrated hydrochloric acid. The resulting mixture was stirred for 2 minutes and then filtered. The solid so isolated was washed with water on the filter and then discarded. The combined filtrate and washings were made alkaline by the addition of concentrated ammonium hydroxide solution and the solid which separated was isolated by filtration, washed with water, and dried in vacuo. There was thus obtained 10 g. of 2,2'-propylidenebis(5,6-dimethylbenzimidazole) in the form of a solid having a melting point of 330 to 338° C.

*Analysis.*—Calcd. for $C_{21}H_{24}N_4$: N, 16.85. Found: N, 16.69.

The 2,2'-propylidenebis(5,6-dimethylbenzimidazole) so obtained was converted to its dihydrochloride using the procedure described in Example 2C. The dihydrochloride so obtained had a melting point of 310 to 318° C.

EXAMPLE 4

*22,6'-ethylidenebis(5,6-dimethylbenzimidazole) and the dihydrochloride thereof*

Using the procedure described in Example 3, but replacing diethyl ethylmalonate by diethyl methylmalonate, there was obtained 2,2'-ethylidenebis(5,6-dimethylbenzimidazole) in the form of a solid having a melting point of 287 to 290° C.

*Analysis.*—Calcd. for $C_{20}H_{22}N_4$: N, 17.60. Found: N, 17.42.

The 2,2'-ethylidenebis(5,6-dimethylbenzimidazole) so obtained was converted to its dihydrochloride using the procedure described in Example 2C. The dihydrochloride so obtained had a melting point of 305 to 310° C.

*Analysis.*—Calcd. for $C_{20}H_{24}Cl_2N_4$: C, 61.38; H, 6.18;

Cl, 18.12; N, 14.32. Found: C, 61.06; H, 6.15; Cl, 18.03; N, 14.20.

EXAMPLE 5

*2,2'-pentylidenebis(5,6-dimethylbenzimidazole) and the dihydrochloride thereof*

Using the procedure described in Example 3, but replacing diethyl ethylmalonate by diethyl butylmalonate, there was obtained 2,2'-pentylidenebis(5,6-dimethylbenzimidazole) in the form of a solid having a melting point of 360 to 368° C.

*Analysis.*—Calcd. for $C_{23}H_{28}N_4$: N, 15.54. Found: N, 15.05.

The 2,2'-pentylidenebis,5,6-dimethylbenzimidazole) so obtained was converted to its dihydrochloride using the procedure described in Example 2C. The dihydrochloride monohydrate so obtained had a melting point of 250° C. (dec.).

*Analysis.*—Calcd. for $C_{23}H_{30}Cl_2N_4 \cdot H_2O$: C, 61.19; H, 7.15; Cl, 15.71; N, 12.41. Found: C, 61.70; H, 6.93; Cl, 15.71; N, 12.10.

EXAMPLE 6

*2,2'-methylenebis(5,6-dimethyl-1-ethylbenzimidazole) and the dihydrochloride thereof*

(A) *2'-nitro-4',5'-dimethyl-p-toluenesulfonanilide sodium salt.*—To a solution of 16.6 g. of 2-nitro-4,5-dimethylaniline (Takatori et al., J. Pharm. Soc. Japan 75, 881, 1955; C. A. 50, 4920i, 1956) in 50 ml. of pyridine was added 19.0 g. of p-toluenesulfonyl chloride. The mixture was heated on a steam bath for 1 hr., cooled, and poured into ice-water. The resulting yellow solid was recovered by filtration, washed with water, and dried. The dried solid was dissolved in hot ethanol, and to this solution was added a methanol solution of sodium methoxide. By filtering this mixture there was obtained 14.0 g. of 2'-nitro-4',5'-dimethyl-p-toluenesulfonanilide sodium salt as a bright yellow solid having a melting point of 310 to 315° C. (dec.).

(B) *2'-nitro-4',5'-dimethyl-N-ethyl-p-toluenesulfonanilide.*—A solution of 15 g. (0.044 mole) of 2'-nitro-4',5'-dimethyl-p-toluenesulfonanilide sodium salt (Part A) and 8 g. (0.051 mole) of ethyl iodide in 75 ml. of dimethylformamide was heated on a steam bath for two hours, cooled, and treated with an approximately equal volume of water. An oil separated which slowly solidified. The solid was recovered on a filter, and dissolved in hot ethanol. Upon cooling, 12 g. of 2'-nitro-4',5'-dimethyl-N-ethyl-p-toluenesulfonanilide having a melting point of 130 to 132° C. was obtained.

*Analysis.*—Calcd. for $C_{17}H_{20}N_2O_4S$: C, 58.60; H, 5.79; N, 8.04. Found: C, 58.52; H, 5.72; N, 8.31.

(C) *2-nitro-4,5-dimethyl-N-ethylaniline.*—A solution of 12 g. (0.034 mole) of 2'-nitro-4',5'-dimethyl-N-ethyl-p-toluenesulfonanilide (Part B) in a mixture of 15 ml. of concentrated sulfuric acid and 3 ml. of water was heated on a steam bath for 3.5 hrs. The reaction mixture was cooled and poured into ice-water. An orange solid separated which was recovered on a filter and dissolved in hot ethanol. On cooling, there was obtained 6.5 g. of 2-nitro-4,5-dimethyl-N-ethylaniline as an orange solid having a melting point of 71 to 74° C.

*Analysis.*—Calcd. for $C_{10}H_{14}N_2O_2$: C, 61.83; H, 7.27; N, 14.43. Found: C, 61.47; H, 6.74; N, 14.53.

(D) *4,5-dimethyl-N-ethyl-1,2-phenylenediamine dihydrochloride.*—A suspension of 6.5 g. (0.033 mole) of 2-nitro-4,5-dimethyl-N-ethylaniline (Part C) in 50 ml. of ethanol acidified with 3 ml. of concentrated hydrochloric acid was hydrogenated in the presence of platinum oxide catalyst until the theoretical amount of hydrogen had been absorbed. The suspension was filtered to remove the catalyst, and the solvent was removed under reduced pressure. The residue thus obtained was dissolved in hot ethanol and poured into ether with vigorous stirring. An oil separated and slowly solidified. The solid was recovered on a filter and dried. There was thus obtained 7.6 g. of 4,5-dimethyl-N-ethyl-1,2-phenylenediamine dihydrochloride having a melting point of 135 to 138° C.

(E) *2,2'-methylenebis(5,6-dimethyl-1-ethylbenzimidazole) and the dihydrochloride thereof.*—A suspension of 4.72 g. (0.02 mole) of 4,5-dimethyl-N-ethyl-1,2-phenylenediamine dihydrochloride (Part D) in 25 ml. of methanol was mixed with 4.04 g. of triethylamine. The mixture was swirled while 2.31 g. (0.01 mole) of malonimino diethyl ether dihydrochloride was added. The reaction mixture was heated at the reflux temperature for 45 min., during which time ammonium chloride separated, and after cooling, it was poured into water. The solid material which separated was recovered on a filter. After washing thoroughly with water, it had a gelatinous consistency. After removing the water by azeotropic distillation with a mixture of benzene and ethanol, the benzene and ethanol were removed by evaporation. The residue thus obtained was dissolved in methylene chloride, the solution was filtered, and the methylene chloride was evaporated, to give 2,2'-methylenebis(5,6-dimethyl-1-ethylbenzimidazole). After dissolving the free base thus obtained in ethanol, the ethanolic solution was acidified with an excess of anhydrous hydrogen chloride dissolved in ethyl acetate and the solution was refrigerated. The crystalline solid that separated was recoverel on a filter and washed with ethyl acetate to give 2.0 g. of 2,2'-methylenebis(5,6-dimethyl-1-ethylbenzimidazole) dihydrochloride having a melting point of 280 to 283° C. (dec.).

*Analysis.*—Calcd. for $C_{23}H_{30}Cl_2N_4$: N, 12.93; Cl, 16.36. Found: N, 13.28; Cl, 16.00.

EXAMPLE 7

*2,2'-methylenebis(1,5,6-trimethylbenzimidazole) and the dihydrochloride thereof*

A suspension of 3.8 g. (0.017 mole) of N-4,5-trimethyl-1,2-phenylenediamine dihydrochloride in 50 ml. of methanol was mixed with 3.5 g. of triethylamine. To the solution thus obtained was added 1.97 g. (0.0085 mole) of malonimino diethyl ether dihydrochloride and the reaction mixture was heated at the reflux temperature for 45 minutes, during which time ammonium chloride separated. After cooling, the reaction mixture was poured into water and the solid that separated was recovered on a filter. The solid was washed thoroughly with water and it developed a gelatinous consistency. After removing the water by azeotropic distillation with a mixture of benzene and ethanol, the benzene-ethanol solvent was removed by evaporation, to give 2,2'-methylenebis(1,5,6-trimethylbenzimidazole). The free base thus obtained was dissolved in methylene chloride, the solution was filtered, and the methylene chloride was evaporated. The residue thus obtained was dissolved in ethanol, and the solution was acidified with an excess of hydrogen chloride in ethyl acetate and refrigerated. The 2,2'-methylenebis(1,5,6-trimethylbenzimidazole) dihydrochloride, which separated as a colorless solid, weighed 1.20 g. and had a melting point of 300° C. (dec.).

*Analysis.*—Calcd. for $C_{21}H_{26}Cl_2N_4$: N, 13.82; Cl, 17.49. Found: N, 13.54; Cl, 17.35.

EXAMPLE 8

*2,2'-methylenebis(1-n-butyl-5,6-dimethylbenzimidazole) and the dihydrochloride thereof*

Using the procedure described in Example 6E, but replacing 4,5-dimethyl-N-ethyl-1,2-phenylenediamine dihydrochloride by N-n-butyl-4,5-dimethyl-1,2-phenylenediamine dihydrochloride, there is obtained 2,2'-methylenebis(1-n-butyl-5,6-dimethylbenzimidazole) and the dihydrochloride thereof.

EXAMPLE 9

*2,2'-heptylidenebis(5,6-dimethylbenzimidazole) and the dihydrochloride thereof*

Using the procedure described in Example 3, but replacing diethyl ethylmalonate by diethyl hexylmalonate, there is obtained 2,2'-heptylidenebis(5,6-dimethylbenzimidazole). The latter is converted to its dihydrochloride using the procedure described in Example 2C.

EXAMPLE 10

*2,2'-methylenebis(5,6-diethylbenzimidazole) and the dihydrochloride thereof*

Using the procedure described in Example 2B, but replacing 4,5-dimethyl-1,2-phenylenediamine by 4,5-diethyl-1,2-phenylenediamine (Lambooy, supra), there is obtained 2,2'-methylenebis(5,6-diethylbenzimidazole). The latter compound is converted to the corresponding dihydrochloride using the procedure described in Example 2C.

EXAMPLE 11

*2,2'-propylidenebis(5,6-diethylbenzimidazole) and the dihydrochloride thereof*

Using the procedure described in Example 3, but replacing 4,5-dimethyl-1,2-phenylenediamine by 4,5-diethyl-1,2-phenylenediamine, there is obtained 2,2'-propylidenebis(5,6-diethylbenzimidazole). The latter compound is converted to the corresponding dihydrochloride using the procedure described in Example 2C.

We claim:
1. A compound selected from the class consisting of (a) a 2,2'-alkylenebisbenzimidazole having the formula:

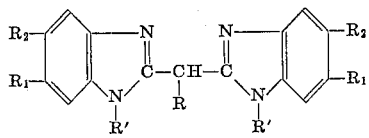

wherein R and R' are selected from the class consisting of hydrogen and lower-alkyl and $R_1$ and $R_2$ represent lower-alkyl, and (b) the pharmacologically acceptable acid addition salts thereof.

2. 2,2'-methylenebis(5,6-dimethylbenzimidazole).
3. 2,2'-methylenebis(5,6-dimethylbenzimidazole) dihydrochloride.
4. 2,2'-ethylidenebis(5,6-dimethylbenzimidazole).
5. 2,2'-ethylidenebis(5,6-dimethylbenzimidazole) dihydrochloride.
6. 2,2'-propylidenebis(5,6-dimethylbenzimidazole).
7. 2,2'-propylidenebis(5,6-dimethylbenzimidazole) dihydrochloride.
8. 2,2'-pentylidenebis(5,6-dimethylbenzimidazole).
9. 2,2'-pentylidenebis(5,6-dimethylbenzimidazole) dihydrochloride.
10. 2,2'-methylenebis(5,6-dimethyl-1-ethylbenzimidazole).
11. 2,2'-methylenebis(5,6-dimethyl-1-ethylbenzimidazole) dihydrochloride.
12. 2,2'-methylenebis(1,5,6-trimethylbenzimidazole).
13. 2,2'-methylenebis(1,5,6-trimethylbenzimidazole) dihydrochloride.

References Cited

UNITED STATES PATENTS

| | | | |
|---|---|---|---|
| 2,479,152 | 8/1949 | Brooker | 260—240.7 |
| 2,697,712 | 12/1954 | Arnold | 260—309.2 |
| 3,105,837 | 10/1963 | Ursprung | 260—309.2 |

FOREIGN PATENTS

| | | |
|---|---|---|
| 618,889 | 3/1949 | Great Britain. |
| 677,540 | 8/1952 | Great Britain. |

OTHER REFERENCES

Arnold et al., Chem. Abstracts, vol. 52, p. 17241 (1958).

David et al., Chem. Abstracts, vol. 51, col. 8020 (1957).

Feitelson et al., J. Chem. Soc., 1952, pp. 2389–98.

Lane, J. Chem. Soc. 1953, pp. 2238–40.

Lane J. Chem. Soc. 1955, pp. 1079–81.

Wang, Ph.D. Dissertation, "Synthesis of Bis-Benzimidazoles as Potential Antimetabolites" particularly pp. 6, 12, 13 (Univ. Microfilms, Ann Arbor, Mich.).

Wang et al., J. Am. Chem. Soc., vol. 79, pp. 5706–8 (1957).

WALTER A. MODANCE, *Primary Examiner.*

D. T. McCUTCHEN, N. TROUSOF,
*Assistant Examiners.*